United States Patent Office 2,813,101
Patented Nov. 12, 1957

2,813,101

STABILIZED INSECT REPELLENT COMPOSITION

Lyle D. Goodhue, Bartlesville, and Kenneth E. Cantrel, Dewey, Okla., assignors to Phillips Petroleum Company, a corporation of Delaware No Drawing. Application October 14, 1955,
Serial No. 540,644

14 Claims. (Cl. 260—295)

This invention relates to stabilized compositions for repelling insects and to methods for repelling insects. In one aspect the invention provides a stabilized pyridine dicarboxylic acid ester insect repellent containing hydroquinone and/or one of its derivatives. In another of its aspects, the invention relates to a method for repelling insects which comprises applying to the locus to be rendered repellent, a pyridine dicarboxylic acid diester repellent and at least one of hydroquinone and its derivatives. In another aspect the invention relates to a method for stabilizing a diester of a pyridine dicarboxylic acid having insect repellent properties which comprises incorporating therewith at least one of hydroquinone and its derivatives.

It is an object of this invention to stabilize insect repellents containing at least one di-n-alkyl ester of a dicarboxylic acid of pyridine wherein each alkyl group contains from 2 to 4 carbon atoms.

It is another object of the invention to provide an improved insect repellent which is stabilized against deterioration, especially by sunlight or actinic rays. It is another object of the invention to provide an improved method of repelling insects, particularly flies.

Other objects, as well as aspects and advantages, of the invention are apparent from this disclosure and the appended claims.

The diethyl, di-n-propyl and di-n-butyl esters of a dicarboxylic acid of pyridine are known to be effective as agents for repelling house flies, stable flies, and other insects from surfaces frequented by the insects when the compounds are applied to such surfaces, as set forth and claimed in application Serial No. 240,602 of N. J. Leonard, filed August 6, 1951 and now Patent No. 2,757,120. The fly repelling activity of these esters is known to be synergized by the incorporation of N-alkyl imides of bicyclo[2.2.1]-5-heptene-2,3-dicarboxylic acid, as disclosed and claimed in application Serial No. 453,122 of Goodhue et al., filed August 30, 1954. An improved insect repellent composition containing at least one of diethyl, di-n-propyl and di-n-butyl esters of pyridine dicarboxylic acid and at least one of 1-acetoxy-3-phenyl-2-butene and 1-acetoxy-3-phenyl-2-propene is disclosed and claimed in application Serial No. 515,237, of Lyle D. Goodhue, filed June 13, 1955. In Serial No. 517,054, Goodhue et al., filed June 21, 1955, an insect repellent composition comprising at least one 1-acetoxy-3-phenyl-2-alkene wherein the alkene is a normal alkene having from 3 to 4 carbon atoms, at least one di-n-alkyl ester of a dicarboxylic acid of pyridine wherein the alkyl groups contain from 2 to 4 carbon atoms, and at least one N-alkyl imide of bicyclo[2.2.1]-5-heptene-2,3-dicarboxylic acid wherein the alkyl radical contains not more than 12 carbon atoms, is disclosed and claimed.

In said copending application Serial No. 240,602, laboratory test strips having been prepared with unsulfured molasses and having been impregnated with the repellents there claimed, as described in Example I of that application, prevented feeding of flies even after 150 minutes at which time the test was ended. In Example II, and elsewhere in that application, practical tests conducted in a stable gave repellencies for periods of two weeks. Therefore, it is clear that the repellents of said copending application possess highly desirable repellency, per se.

It has now been discovered that the di-n-alkyl esters of a dicarboxylic acid of pyridine, wherein each alkyl group contains from 2 to 4 carbon atoms, gradually lose their effectiveness as insect repellents upon continued exposure to sunlight, and we have now discovered that a class of compounds of the hydroquinone family, as set forth hereafter, when incorporated with said esters are effective in stabilizing and extending the repellent life of these esters and compositions containing them when exposed to sunlight or actinic rays.

According to our invention there is provided an insect repellent composition comprising at least one di-n-alkyl ester of a dicarboxylic acid of pyridine wherein each alkyl group contains from 2 to 4 carbon atoms and at least one compound having the following general structural formula:

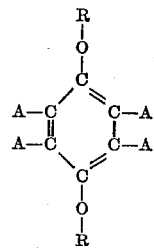

wherein R is hydrogen or an alkyl, aryl, aralkyl, or alkaryl radical containing from 1 to 8 carbon atoms, and A is hydrogen, a halogen selected from the group consisting of chlorine and bromine, or an alkyl, aryl, alkaryl, aralkyl or cycloalkyl radical containing from 1 to 8 carbon atoms. The R's are alike or different. The A substituents are alike or different, and not more than one A substituent is a halogen.

Further, according to the invention, there is provided a method of stabilizing an insect repellent containing as an essential active ingredient at least one of the di-n-alkyl esters of a dicarboxylic acid of pyridine wherein each alkyl group contains from 2 to 4 carbon atoms, which comprises adding thereto at least one compound having the structural formula set forth hereinbefore.

Also, according to the invention, there is provided a method for repelling insects, especially flies, which comprises applying to the locus from which the flies are to be repelled a repellent comprising at least one di-n-alkyl ester of a dicarboxylic acid of pyridine wherein each alkyl group contains from 2 to 4 carbon atoms, stabilized with at least one of the compounds of the above structural formula.

The insect repellent compositions contain at least one of the diesters mentioned above as an essential active repellent ingredient and at least one of the stabilizing compounds of the above general formula in a stabilizing proportion. The repellent composition is effective and useful in this form but more usually comprises also an adjuvant carrier or solvent, as further discussed hereafter. The composition can also contain other repellent compounds, as well as materials synergistic for the active repellent compounds. For example, the compositions of Serial Numbers 240,602; 453,122; 515,237; and 517,054 can be stabilized by the addition thereto of stabilizers of the present invention.

Exemplary of compounds of the general formula which are employed in the present invention are hydroquinone, 2-phenylhydroquinone, 2-tert-butylhydroquinone, 2-chlorohydroquinone, 2-methylhydroquinone, 4-benzyloxyphenol (monobenzyl ether of hydroquinone), 2-bromo-5-ethylhydroquinone, 2,3,5,6-tetramethyl hydroquinone, 2-p-tolyl-4-methoxyphenol, 2,5-di-tert-butylhydroquinone, 2-n-octyl-3-chloro-1,4-di-(ethoxy)benzene, and 4-(3,5-dimethyl)phenoxyphenol, and 2-bromo-5-cyclohexylhydroquinone.

The repellent composition can be applied to the desired surfaces in any suitable form, such as a solution in a mutual solvent, as an emulsion, aerosol, fog, and the like, and in any suitable manner, as by spraying, brushing, dipping, and the like. Application, according to the invention, can be effected by first applying one of the ingredients of the mixture and then applying another, and so on. For best and now preferred results, in any event, the compositions, as applied, are made up to contain a repellent adjuvant to dilute the active ingredients to an effective, but not undesirably high, concentration. Solvents, diluents, or other adjuvant carriers which are applicable include acetone, hydrocarbons such as kerosene, naphthas, and other liquid hydrocarbons. The now preferred solvent is an isoparaffinic hydrocarbon having a boiling range of approximately 260 to 800° F. Powders or dusts, such as, for instance, talc, are also sometimes used as the adjuvant carrier. Though not presently preferred, the repellent composition can be employed without a carrier, if desired. Solid materials such as talc or kieselguhr, for instance, can also be employed as the adjuvant carrier. A now preferred manner of applying these stabilized repellents is in the form of wettable powders, a form in which repellent and stabilizer are impregnated upon a finely divided attapulgite clay. Other clays, which have a high surface area per pound are also applicable.

When an adjuvant carrier or solvent is employed in conjunction with the stabilized repellents of the invention, the active repellent in the composition will generally be in the concentration of from 0.3 to 30 weight percent of the carrier material. It is now preferred that the range is from 0.5 to 15 weight percent of the carrier material.

The stabilized repellent compositions of this invention are preferably applied to the surface which is to be protected in the form of a very thin film, or a very thin layer of dust, as the case may be. In general, 0.01 to 5 grams of the combined weight of active repellent and stabilizer are deposited on each square foot of surface from which the flies are to be repelled, although larger or smaller amounts can be used. It is now preferred to employ from 0.1 to 3 grams on the above basis.

The proportions in which the stabilizer and repellent are mixed or applied to a given surface can vary depending upon the surface to which the materials are applied and also upon the method of application. Preferably, the weight ratio of stabilizing material to ester of pyridine dicarboxylic acid varies from 1:5 to 1:1, although ratios as low as 1:20 and as high as 1:0.5 are applicable and even lower or higher ratios can be used. Combinations of more than one of the pyridine dicarboxylic ester repellents with one or more of the stabilizers are included within the scope of this invention. Although application to a surface is referred to in the description of the invention, it is clear that the invention includes within its scope and, therefore, the claims read on spray application to such a surface and/or on the spraying of the repellent composition into a space from which the insect is to be repelled.

Examples of the esters of pyridine dicarboxylic acids employed in our invention include di-n-propyl ester of pyridine-3,4-dicarboxylic acid, the diethyl ester of pyridine-3,5-dicarboxylic acid, the diethyl ester of pyridine-2,5-dicarboxylic acid, the di-n-propyl ester of pyridine-2,5-dicarboxylic acid, the di-n-butyl ester of pyridine-2,5-dicarboxylic acid, the diethyl ester of pyridine-2,6-dicarboxylic acid, the di-n-propyl ester of pyridine-2,6-dicarboxylic acid, the di-n-propyl ester of pyridine-2,4-dicarboxylic acid, the diethyl ester of pyridine-2,4-dicarboxylic acid, the di-n-propyl ester of pyridine-2,3-dicarboxylic acid, and the diethyl ester of pyridine-2,3-dicarboxylic acid. Of the pyridine dicarboxylic acid diesters those of pyridine-2,5-dicarboxylic acid are now preferred, especially the di-n-propyl ester of pyridine-2,5-dicarboxylic acid.

The following examples illustrate the improved repellent compositions of the invention:

*Example 1*

Pyridine dicarboxylic diester repellents in admixture with hydroquinone or various hydroquinone derivatives were tested to determine their effective repellent life by the following procedure.

Strips of porous lens paper, 1" x 4" in dimensions, were impregnated with the repellent-stabilizer mixture which was to be tested by immersing the strips in an acetone solution containing the desired quantity of repellent-stabilizer mixture and then allowing the strips to dry over a period of from four to six hours. These impregnated strips were then exposed to the light of a commercial sun lamp (General Electric Sunlight S-1). The sun lamp was suspended in a shade above a phonograph turn-table (33 R. P. M.) on which was mounted an aluminum dishpan. Two large cellulose sponges were placed in the dishpan and covered with #4 mesh hardware cloth. The pan was filled to a shallow depth with water so that the sponges were always kept wet, and clean filter paper was placed on the hardware cloth. The impregnated strips were exposed to the sun lamp by pinning the strips to the filter paper. The distance from the test strips to the light, normally about 9", was adjusted so that a temperature at the level of the strips was maintained at about 100° F. The strips were thus exposed to the sun lamp with the phonograph turn-table rotating so that each strip exposed received the same degree of sun lamp exposure as the other strips. This sun lamp exposure was carried out for a period of four hours.

After the strips were exposed to the sun lamp, they were tested for repellency to house flies by the Sandwish Bait method which is essentially the same as disclosed by L. B. Kilgore in "Soap," June, 1949. In accordance with this method, to a sheet of cardboard were applied two smooth, thin strips of unsulfured molasses about ⅜" wide and 3½" long leaving a margin of at least ¼" all around and a space of at least 1" between the strips. The prepared cardboard strips were then oven dried at 45° C. The repellent impregnated strips as prepared above were then superimposed onto each strip of molasses and fastened in place by stapling it to the cardboard backing.

The prepared strips were then exposed to about 150 house flies, *Musca Domestica*, over five days old, which had been starved for at least five hours. The loose fibrous construction of the impregnated lens paper permitted the flies to remove the molasses through the strip. Counts of the number of flies feeding on the strips were then taken periodically for 2½ to 2¾ hours. The stabilized repellents of the present invention were tested by this described method. In these tests, acetone solutions containing 0.5% by weight of the di-n-propyl ester of pyridine-2,5-dicarboxylic acid and 0.5% by weight of the hydroquinone stabilizer to be tested were tested against an acetone solution containing 0.5% of the di-n-propyl pyridine dicarboxylic alone. The results of these tests are given below as Table I.

of the di-n-propyl ester of pyridine-2,5-dicarboxylic acid, 12.5 grams of hydroquinone, and 1.5 grams of an alkylated

TABLE I.—COMPOUNDS TESTED [1]

[Figures represent number of flies feeding.]

| Time (Minutes) | 0.5R, 0.5I | 0.5R, 0.5II | 0.5R, 0.5III | 0.5R, 0.5IV | 0.5R, 0.5V | 0.5R, 0.5VI | 0.5R, 0.5VII | 0.5R (No Stabilizer) |
|---|---|---|---|---|---|---|---|---|
| 5 | 0 | 0 | 0 | 0 | 0 | 0 | 1 | 0 |
| 15 | 0 | 0 | 0 | 0 | 0 | 0 | 2 | 1 |
| 30 | 0 | 0 | 0 | 0 | 0 | 0 | 0 | 0 |
| 45 | 0 | 0 | 0 | 0 | 0 | 0 | 2 | 1 |
| 60 | 0 | 0 | 0 | 0 | 0 | 0 | 2 | 0 |
| 75 | 0 | 0 | 1 | 0 | 0 | 0 | 3 | 0 |
| 90 | 0 | 0 | 0 | 0 | 1 | not checked | not checked | 5 |
| 105 | 0 | 0 | 0 | 0 | 0 | 1 | 1 | 15 |
| 120 | 0 | 0 | 0 | 0 | 0 | not checked | not checked | 26 |
| 135 | 0 | 0 | 0 | 0 | 0 | 0 | 2 | 19 |
| 150 | 0 | 1 | 3 | 0 | 0 | not checked | not checked | 7 |
| 165 | 0 | 0 | 3 | 0 | 0 | do | do | 7 |
|  | 0 | 0 | 5 | 1 | 0 | 0 | gone | gone |
| Estimated Percent of Molasses Remaining. | 100 | 100 | 95 | 100 | 100 | not estimated | not estimated | 0 |

[1] R—di-n-propyl ester of pyridine-2,5-dicarboxylic acid; I—2-chlorohydroquinone; II—2-tert-butylhydroquinone; III—2-methylhydroquinone; IV—2-phenylhydroquinone; V—hydroquinone; VI—2,5-di-tert-butylhydroquinone; VII—hydroquinone, monobenzyl ether.

*Example II*

Hydroquinone and the di-n-propyl ester of pyridine-2,5-dicarboxylic acid were tested alone and in admixture together as housefly repellents after exposure to the ultraviolet light. These tests were carried out using the same procedure as was used in Example I except that the materials were exposed to the sun lamp for a period of 8 hours.

In these tests, strips impregnated with a 0.5% by weight hydroquinone solution were compared with strips impregnated with a 0.5% by weight di-n-propyl ester of pyridine-2,5-dicarboxylic acid solution and with strips which had been impregnated with a solution which contained 0.5% by weight hydroquinone and 0.5% by weight di-n-propyl ester of pyridine-2,5-dicarboxylic acid. The results of these tests are expressed below as Table II.

TABLE II.—Compounds Tested [1]

[Figures represent number of flies feeding]

| Time (Minutes) | 0.5V | 0.5R | 0.5R+0.5V |
|---|---|---|---|
| 5 | 2 | 15 | 0 |
| 15 | 10 | 28 | 0 |
| 30 | 31 | 27 | 0 |
| 45 | 48 | 25 | 0 |
| 60 | 33 | 11 | 0 |
| 75 | 28 | 3 | 1 |
| 90 | 26 | 6 | 5 |
| 105 | 15 | molasses gone | 15 |
| 120 | molasses gone |  | 5 |
| 135 |  |  | 0 |
| 150 |  |  | 1 |
| 165 |  |  | 1 |
| Estimated Amount of Molasses Remaining, percent |  |  | 5 |

[1] R—di-n-propyl ester of pyridine-2,5-dicarboxylic acid; V—hydroquinone.

The data given above as Table II are illustrative of the stabilized repellents of this invention. The di-n-propyl ester of pyridine-2,5-dicarboxylic acid, an excellent repellent before exposure to ultraviolet light, is practically non-repellent after exposure to an ultraviolet light for 8 hours. This non-repellency is indicated by the large numbers of flies feeding on the molasses. However, when the di-n-propyl ester of pyridine-2,5-dicarboxylic acid is admixed with hydroquinone, a non-repellent itself, before exposure to the ultraviolet light, the repellency shown by this mixture is quite pronounced and is exemplified by the very small numbers of flies feeding on the repellent-treated molasses strips.

*Example III*

A wettable powder formulation of stabilized repellent was made up in the following manner. Twenty-five grams of the di-n-propyl ester of pyridine-2,5-dicarboxylic acid, 12.5 grams of hydroquinone, and 1.5 grams of an alkylated aryl polyether alcohol wetting agent sold under the trade name of Triton X100 were dissolved in 100 cc. of acetone. Sixty-one grams of Attasorb, a finely divided attapulgite clay, was then added and stirred vigorously. The impregnated attapulgite clay was then placed on a piece of sheet metal to dry. Paper or other adsorbent material was avoided while spreading the impregnated clay to dry, as the acetone, containing the active repellent, would have been adsorbed from the clay. After the clay was thoroughly dried, the impregnated clay was then rubbed through a 60-mesh screen to break up any lumps.

A 2% by weight aqueous dispersion of the wettable powder as prepared above was made up and strips were dipped in this material, dried, exposed to the sunlamp for eight hours by the method of Example I, and tested by the Sandwish Bait method as previously described. The results of this test are expressed below as Table III.

TABLE III

| Time (Minutes) | Number of Flies Feeding |
|---|---|
| 5 | 0 |
| 15 | 0 |
| 30 | 0 |
| 45 | 0 |
| 60 | 0 |
| 75 | 0 |
| 90 | 0 |
| 105 | 0 |
| 120 | 0 |
| 135 | 0 |
| 150 | 0 |
| 165 | 0 |
| Percent Molasses Remaining (Estimated) | 100 |

*Example IV*

The wettable powder formulation described in Example III was made up as an aqueous dispersion using sufficient wettable powder to produce an aqueous dispersion containing 4 percent by weight of di-n-propyl isocinchomeronate. This solution was applied to the four walls and the ceiling of a hog house in an amount sufficient to wet the wall surfaces. (The hog house had a floor area of 8 x 16 feet, a rear height of 6 feet, and a front height of 8 feet, and a total wall area of 468 square feet excluding the floor.) A similar hog house adjacent to the one just described was left untreated to serve as a control.

The number of flies present in the two hog houses was determined three days prior to the treatment and on the day of treatment but prior to the treatment. Also, the number of flies in the two hog houses was determined at intervals subsequent to the treatment and the results of these counts are shown in Table I. These counts were taken at intervals during a period of 16 days following the treatment. A standard Scudder grid 36 inches square made up of ¾-inch slats placed ¾ inch apart was placed on the dirt floor where flies appeared most numerous in each of the two hog houses. Total flies on the grid were then counted on each of the grids on the days indicated in the table below.

TABLE I

| Day | Number Flies on Grid | |
| --- | --- | --- |
| | Untreated House | Treated House |
| 3 days before treatment | 29 | 58 |
| Day of treatment (but before spraying) | 29 | 30 |
| 1 day after treatment | 37 | 3 |
| 2 days after treatment | 31 | 4 |
| 3 days after treatment | 20 | 3 |
| 6 days after treatment | 214 | 35 |
| 9 days after treatment | 228 | 85 |
| 16 days after treatment | 552 | 135 |

During the period from 17 days to 72 days after treatment, the total number of flies on the walls of each of the hog houses was recorded at intervals and the counts are shown in Table II. It will be noted that even at the end of the 72-day period subsequent to treatment, a significant reduction in fly population was noted in the treated hog houses. It was also noted when these tests were made that no appreciable number of flies was observed on the bare walls of the treated hog house but that substantially all flies present were found on soil rubbed on the walls by the hogs which inhabited the hog house.

TABLE II

| Day | Total Flies on Walls | |
| --- | --- | --- |
| | Untreated House | Treated House |
| 17 days after treatment | 144 | 71 |
| 23 days after treatment | 93 | 46 |
| 30 days after treatment | 82 | 55 |
| 37 days after treatment | 30 | 14 |
| 42 days after treatment | 4 | 0 |
| 51 days after treatment | 16 | 3 |
| 57 days after treatment | 22 | 12 |
| 65 days after treatment | 13 | 10 |
| 72 days after treatment | 11 | 2 |

These data show clearly the increased effective life of the ester repellent compositions containing the stabilizers of the invention, when the compositions are exposed to sunlight or actinic light.

As will be evident to those skilled in the art, various modifications of this invention can be made or followed in light of the foregoing disclosure and discussion without departing from the sipirt or the scope of the disclosure or from the scope of the claims.

We claim:
1. A method of stabilizing an insect repellent composition containing as an essential ingredient di-n-alkyl ester of a dicarboxylic acid of pyridine wherein the alkyl groups each contain from 2 to 4 carbon atoms which comprises adding thereto a compound having the formula

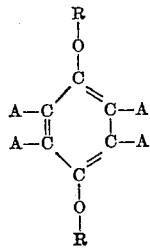

wherein each R is a member of the group consisting of hydrogen, an alkyl hydrocarbon group, aryl hydrocarbon group, an aralkyl hydrocarbon group, and an alkaryl hydrocarbon group, each of said hydrocarbon groups containing from 1 to 8 carbon atoms, and each A is a member of the group consisting of hydrogen, a halogen selected from the group consisting of chlorine and bromine, an alkyl hydrocarbon group, an aryl hydrocarbon group, an aralkyl hydrocarbon group, an alkaryl hydrocarbon group, and a cycloalkyl hydrocarbon group, each of said hydrocarbon substituent groups containing from 1 to 8 carbon atoms, and wherein not more than one of said A substituents is a halogen.

2. An insect repellent composition containing as an essential active ingredient di-n-alkyl ester of a dicarboxylic acid of pyridine wherein the alkyl groups each contain from 2 to 4 carbon atoms which comprises adding thereto a compound having the formula

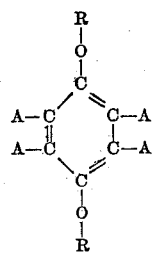

wherein each R is a member of the group consisting of hydrogen, an alkyl hydrocarbon group, an aryl hydrocarbon group, an aralkyl hydrocarbon group, and an alkaryl hydrocarbon group, each of said hydrocarbon groups containing from 1 to 8 carbon atoms, and each A is a member of the group consisting of hydrogen, a halogen selected from the group consisting of chlorine and bromine, an alkyl hydrocarbon group, aryl hydrocarbon group, an aralkyl hydrocarbon group, an alkaryl hydrocarbon group, and a cycloalkyl hydrocarbon group, each of said hydrocarbon substituent groups containing from 1 to 8 carbon atoms, and wherein not more than one of said A substituents is a halogen.

3. A method according to claim 1 in which the weight ratio of the compound to the ester of pyridine dicarboxylic acid is in the range 1:5–1:1.

4. A method according to claim 1 in which the weight ratio of the compound to the ester of pyridine dicarboxylic acid is in the range 1:20–1:0.5.

5. A composition according to claim 2 in which the ratio of the compound to the ester of pyridine dicarboxylic acid is in the range 1:20–1:0.5.

6. A composition of claim 1 wherein the said ester is an ester of pyridine-2,5-dicarboxylic acid.

7. A composition of claim 1 wherein the said ester is the di-n-propyl ester of pyridine-2,5-dicarboxylic acid.

8. A composition of claim 1 wherein the said ester is the diethyl ester of pyridine-2,5-dicarboxylic acid.

9. A composition of claim 1 wherein the said ester is the di-n-butyl ester of pyridine-2,5-dicarboxylic acid.

10. A stabilized repellent composition containing as an essential active ingredient at least one di-n-alkyl ester of a dicarboxylic acid of pyridine wherein each alkyl group contains from 2 to 4 carbon atoms and a stabilizer of hydroquinone.

11. A stabilized repellent composition containing as an essential active ingredient at least one di-n-alkyl ester of a dicarboxylic acid of pyridine wherein each alkyl group contains from 2 to 4 carbon atoms and a stabilizer of 2-phenylhydroquinone.

12. A stabilized repellent composition containing as an essential active ingredient at least one di-n-alkyl ester of a dicarboxylic acid of pyridine wherein each alkyl group contains from 2 to 4 carbon atoms and a stabilizer of 2-tert-butylhydroquinone.

13. A stabilized repellent composition containing as an essential active ingredient at least one di-n-alkyl ester of a dicarboxylic acid of pyridine wherein each alkyl group contains from 2 to 4 carbon atoms and a stabilizer of 2-chlorohydroquinone.

14. A stabilized repellent composition containing as an essential active ingredient at least one di-n-alkyl ester of a dicarboxylic acid of pyridine wherein each alkyl group contains from 2 to 4 carbon atoms and a stabilizer of 2-methylhydroquinone.

References Cited in the file of this patent

The Merck Index, 6th ed., page 510, (1952) Merck and Co., Inc., Rahway, N. J.

Meyer et al.: Monatshefte fur Chemie, vol. 34, pages 518–21.